United States Patent [19]
Kamiyama et al.

[11] Patent Number: 5,356,502
[45] Date of Patent: Oct. 18, 1994

[54] METHOD FOR LINING A BRANCH PIPE

[75] Inventors: Takao Kamiyama, Hiratsuka; Yasuhiro Yokoshima, Ibaraki, both of Japan

[73] Assignees: Shonan Gosei-jushi Seisakusyo K.K., Kanagawa; Yokoshima & Company, Ibaraki, both of Japan

[21] Appl. No.: 139,671

[22] Filed: Oct. 22, 1993

[30] Foreign Application Priority Data

Feb. 9, 1993 [JP] Japan .................. 5-021431

[51] Int. Cl.5 ............................. B29C 63/36
[52] U.S. Cl. .................. 156/267; 156/287; 156/294; 264/269; 264/516; 264/573
[58] Field of Search ........... 156/156, 287, 294, 267; 264/269, 516, 573; 138/97, 98; 405/154

[56] References Cited

U.S. PATENT DOCUMENTS

| | | | |
|---|---|---|---|
| 4,366,012 | 12/1982 | Wood | 156/287 |
| 4,434,115 | 2/1984 | Chick | 264/269 |
| 4,778,553 | 10/1988 | Wood | 156/287 |
| 4,786,345 | 11/1988 | Wood | 156/287 |
| 5,108,228 | 4/1992 | Miyazaki et al. | 156/287 |
| 5,108,533 | 4/1992 | Long et al. | 156/287 |
| 5,200,011 | 4/1993 | Imamura et al. | 156/287 |

FOREIGN PATENT DOCUMENTS

| | | | |
|---|---|---|---|
| 60-242038 | 12/1985 | Japan . | |
| 100437 | 5/1986 | Japan | 138/97 |
| 286326 | 11/1988 | Japan | 138/97 |
| 198325 | 8/1989 | Japan | 138/97 |
| 355116 | 12/1992 | Japan | 264/269 |
| 2157796 | 10/1985 | United Kingdom | 138/97 |

Primary Examiner—Michael W. Ball
Assistant Examiner—Steven D. Maki
Attorney, Agent, or Firm—Lowe, Price, Leblanc & Becker

[57] ABSTRACT

A method for lining a branch pipe comprising the steps of: preparing a tubular liner bag by sewing a rectangular nonwoven resin-absorbent fabric into a tubular shape with one end closed; attaching an impermeable plastic film over the external surface of this tubular liner bag; soaking the nonwoven resin-absorbent fabric with a hardenable fluid resin; everting the liner bag into the branch pipe until the eversion head of the liner bag is stopped by the inner wall of the main pipe; forcing the eversion head of the liner bag to turn downstream in the main pipe, thus allowing the the liner bag to evert entirely; hardening the hardenable fluid resin while inflating the liner bag; and removing that portion of the liner bag which protrudes into the main pipe.

8 Claims, 10 Drawing Sheets

METHOD FOR LINING A BRANCH PIPE

BACKGROUND OF THE INVENTION

1. Field of the Invention

The present invention relates to a method for lining a pipe by applying a lining material on the inner wall of the pipe, and in particular the invention relates to a method for lining a branch pipe branching off a main pipe.

2. Description of the Prior Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film. More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "everting". ) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

This method is applicable to a pipe branching out from a main pipe as well, and how it is conducted will be described next with reference to FIG. 12.

Figure 12:
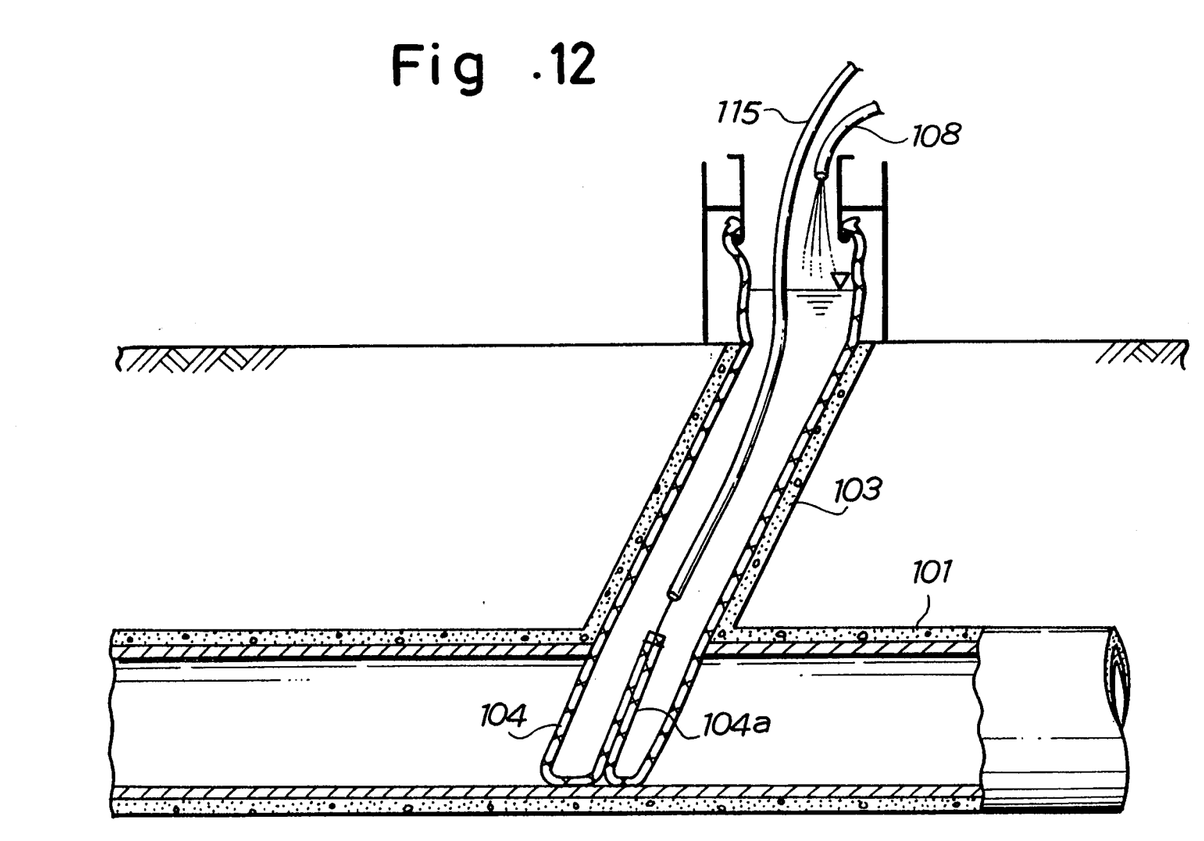
FIG. 12 is a sectional side view of a site containing a branched main pipe, illustrating a conventional method lining the branch pipe.

FIG. 12 is a vertical sectional view of a sewerage site, showing the conventional method of lining a pipe 103 branching out from a main pipe 101. The branch pipe 103 is normally tilted, rather than vertical, in a manner such that the flow of the liquid down the branch pipe 103 acquires a momentum to rush downstream when it enters the main pipe 101. In other words, of the two supplementary angles formed between the branch pipe and the main pipe, the one on the downstream side of the main pipe is greater. Therefore, in FIG. 12, the downstream of the main pipe 101 is to the left. As shown, a flexible tubular liner bag 104 is everted in the underground branch pipe 103 from the ground by means of the pressure of the water supplied from a water hose 108. When the length of the tubular liner bag 104 is substantially greater than the length of the branch pipe 103, then the head of the tubular liner bag 104 hits upon the inner wall of the main pipe 101 and is thus prevented from everting longer. As a result, there occurs an uneverted portion 104a of the liner bag 104. That part of the liner bag 104 which entered the main pipe 101 is removed by cutting operation.

Problems the Invention seeks to solve

At this juncture, hot water is supplied from the hot water hose 115, and the heat of the hot water causes the thermosetting resin impregnated in the liner bag to harden so that there is formed a hard resin lining against the inner wall of the branch pipe 103, such lining being free standing. However, the uneverted portion 104a tends to form a barrier which prevents the smooth circulation of the hot water to the head portion of the liner bag 104. As a result, the head portion fails to cure thoroughly and there occur incompletely cured regions, which render the subsequent cutting operation difficult, since the uncured resin clogs the cutter to make it blunt.

In order to solve this problem a method was proposed wherein the length of the branch pipe is accurately measured and the length of the liner bag used to line the branch pipe is determined based on the measured length of the branch pipe such that the entire liner bag can be everted without its head hitting upon the inner wall of the main pipe, so that there occurs no uneverted portion of the liner bag in the end. However, in actuality, a branch pipe is often bent or curved so that to measure its length accurately is difficult and it is also difficult to accurately predict how much the liner bag would expand as it is inflated by the pneumatic eversion.

The present invention was contrived in view of the above problems, and it is, therefore, an object of the invention to provide an improved method for lining a branch pipe which is so contrived that the thermosetting resin soaking through the liner bag does not fail to cure completely, that the cutting operation can be conducted smoothly and that the lining result will be excellent.

Summary of the Invention

Means to solve the Problems

In order to attain the above and other objects of the invention, there is provided an improved method for lining a branch pipe branching off a main pipe consisting of the steps of: (a) preparing a tubular liner bag by sewing a rectangular nonwoven resin-absorbent fabric into a tubular shape with one end closed and cutting it to a length substantially greater than the length of the branch pipe to be lined; (b) attaching an impermeable plastic film over the external surface of this tubular liner bag; (c) soaking said nonwoven resin-absorbent fabric with a hardenable fluid resin; (d) everting said liner bag into the branch pipe from the ground to the main pipe by means of a fluid pressure until the eversion head of the liner bag is stopped by the inner wall of the main pipe; (e) forcing said eversion head of the liner bag to turn downstream in the main pipe, thus allowing the the liner bag to evert entirely; (f) hardening said hardenable fluid resin while inflating said liner bag by means of the fluid pressure; and (g) removing that portion of said liner bag which protrudes into said main pipe.

In a preferred operation, the main pipe is lined with a liner at first and that portion of the liner which closes the hole to the branch pipe is removed and, thereafter, the branch pipe is lined.

Preferably, the inner surface of the liner bag before eversion is covered with an impermeable barrier film.

In an embodiment, the removal of said portion of the liner bag is conducted by means of a rotary cutter driven by a motor and installed on a robot which can reciprocate freely in the main pipe.

Effects of the Invention

According to the invention, although the branch pipe liner bag will cease everting as its eversion head is stopped by the inner wall of the main pipe, the eversion head is forced to turn downstream, so that the branch pipe liner bag can be eventually everted completely. Therefore, no uneverted portion will remain of the liner bag.

As a result, when hot water, for example, is supplied into the branch pipe liner bag which has been inserted in the branch pipe as described above, the hot water will circulate well into the fore end of the liner bag and causes the thermosetting resin soaked in the liner bag to promptly harden thoroughly and uniformly, so that there occur scarce regions where the branch pipe liner bag is only half hardened.

Since there remains no uneverted gluey portion of the branch pipe liner bag after the curing of the resin, the subsequent operation of cutting away the portion of the liner bag that extends into the main pipe is made easy.

Thus, the present invention attains the above-mentioned objects.

Further scope of applicability of the present invention will become apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description.

The above and other objects and features of the invention will appear more fully hereinafter in the following description given in connection with the accompanying drawings and the novelty thereof pointed out in the appended claims.

EMBODIMENTS

Next, embodiments of the invention will be described with reference to the attached drawings.

Figure 1:
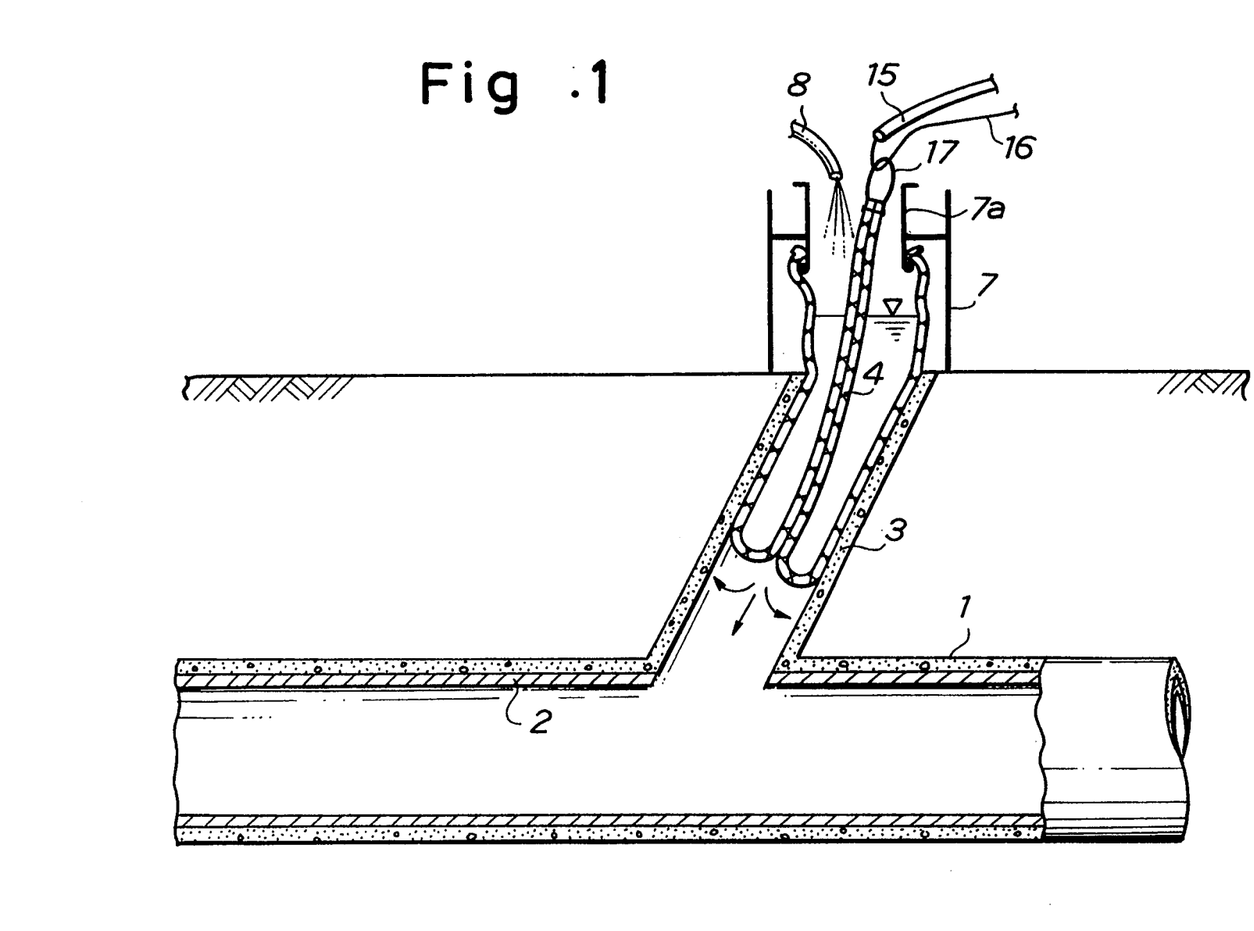
FIG. 1 is a sectional side view of a site containing a branched main pipe, illustrating a step of the branch pipe lining method of the present invention.

In FIG. 1, which schematically shows a site of the pipe repair operation, reference numeral 1 designates an underground main pipe, which is already internally lined with a liner 2 of a hardened material by the conventional lining method. That portion of the liner 2 has been cut off where the main pipe 1 opens into a branch pipe 3; thus, the branch pipe 3 communicates with the main pipe 1 via this port.

Figure 10:
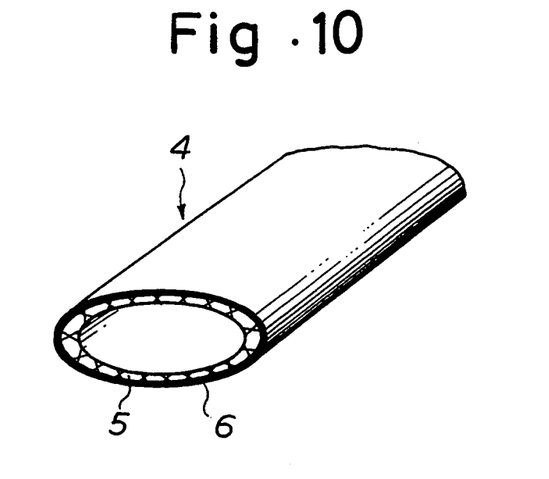
FIG. 10 is a sectional perspective view of a branch pipe liner bag according to an embodiment of the invention.

To line the branch pipe 3, a branch pipe liner bag 4, shown in FIG. 10, is used. But, this pipe liner bag 4 itself must be described in detail first. A rectangular nonwoven resin-absorbent fabric 5 of polyester felt is sewed into a tubular shape. The tubular fabric 5 is then externally coated with an air- and water-tight plastic film 6 and is soaked with a thermosetting resin. (This hermetic film 6 may be made of polyurethane, polyethylene, polyethylene/nylon co-polymer, or polyvinyl chloride resin, and the fabric 5 may be made of polyester, polypropylene, or acrylic resin.)

As shown in FIG. 1, the tubular pipe liner bag 4 to be inserted in the branch pipe 3 has its tail end closed, and the front end everted and anchored sealingly about the outside of the bottom rim of a tubular pressure cap 7a of a frame 7 installed on the ground.

Then, water is poured down the pressure cap 7a from a water charge hose 8, and the water pressure (gravity) forces the liner bag 4 to roll inside out in the branch pipe 3 and to proceed toward the main pipe 1.

Figure 2:
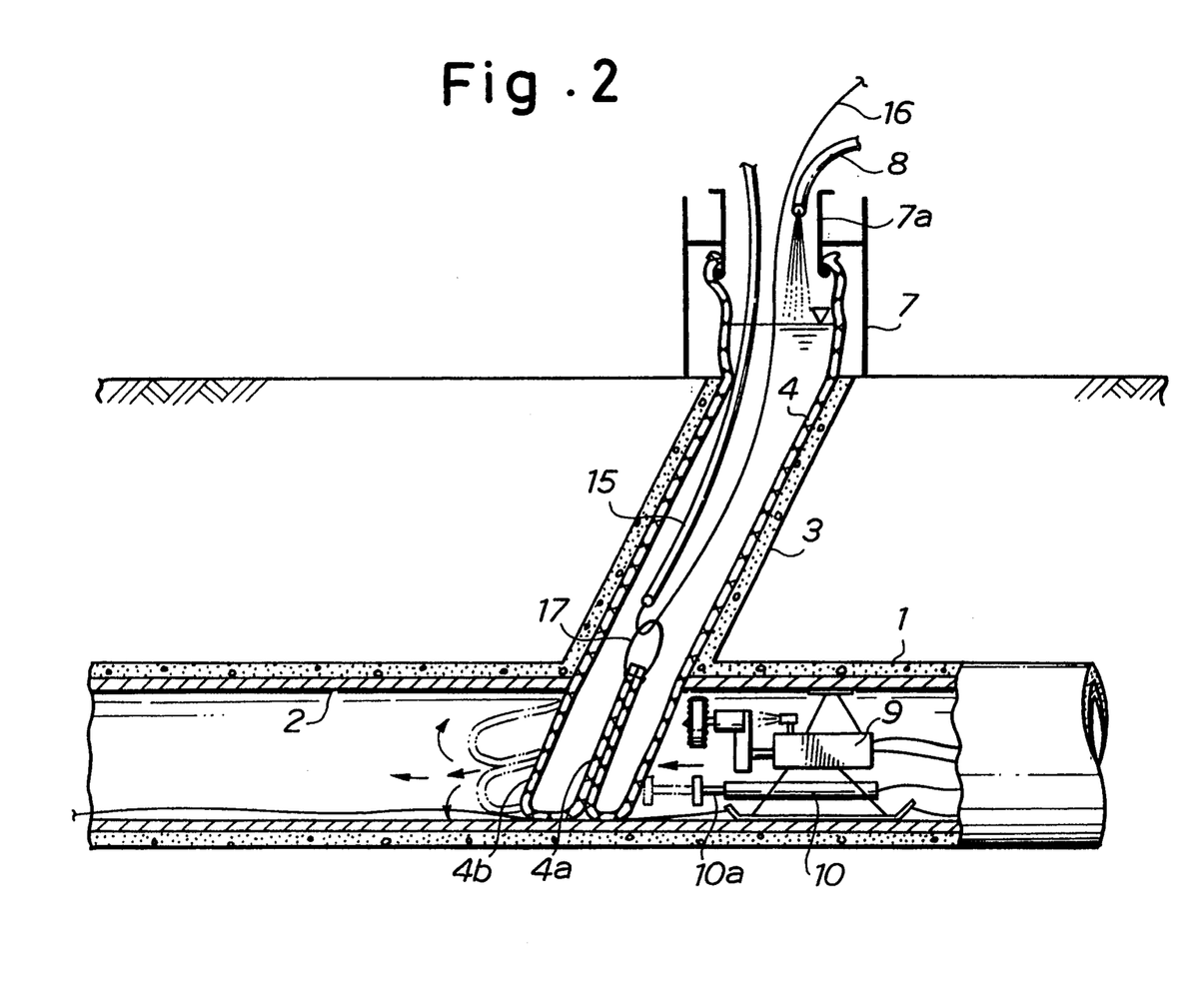
FIG. 2 is a view similar as FIG. 1 illustrating another step of the branch pipe lining method of the invention.

Incidentally, the length of the liner bag 4 is so designed that when the entire length of the bag 4 were everted without being stopped the head of the thoroughly everted bag 4 would extend beyond the port of the main pipe 1 by at least one meter. Therefore, when the liner bag 4 is everted down the branch pipe 3, the everting head of the liner bag 4 would hit upon the inner wall of the main pipe 1, as shown in FIG. 2, for even when the diameter of the the main pipe 1 is greater than one meter the liner bag 4 would more or less expand lengthwise as it is pressed down. Thus, the eversion of the liner bag 4 is stopped and some portion 4a of the liner bag 4 remains uneverted.

Figure 3:
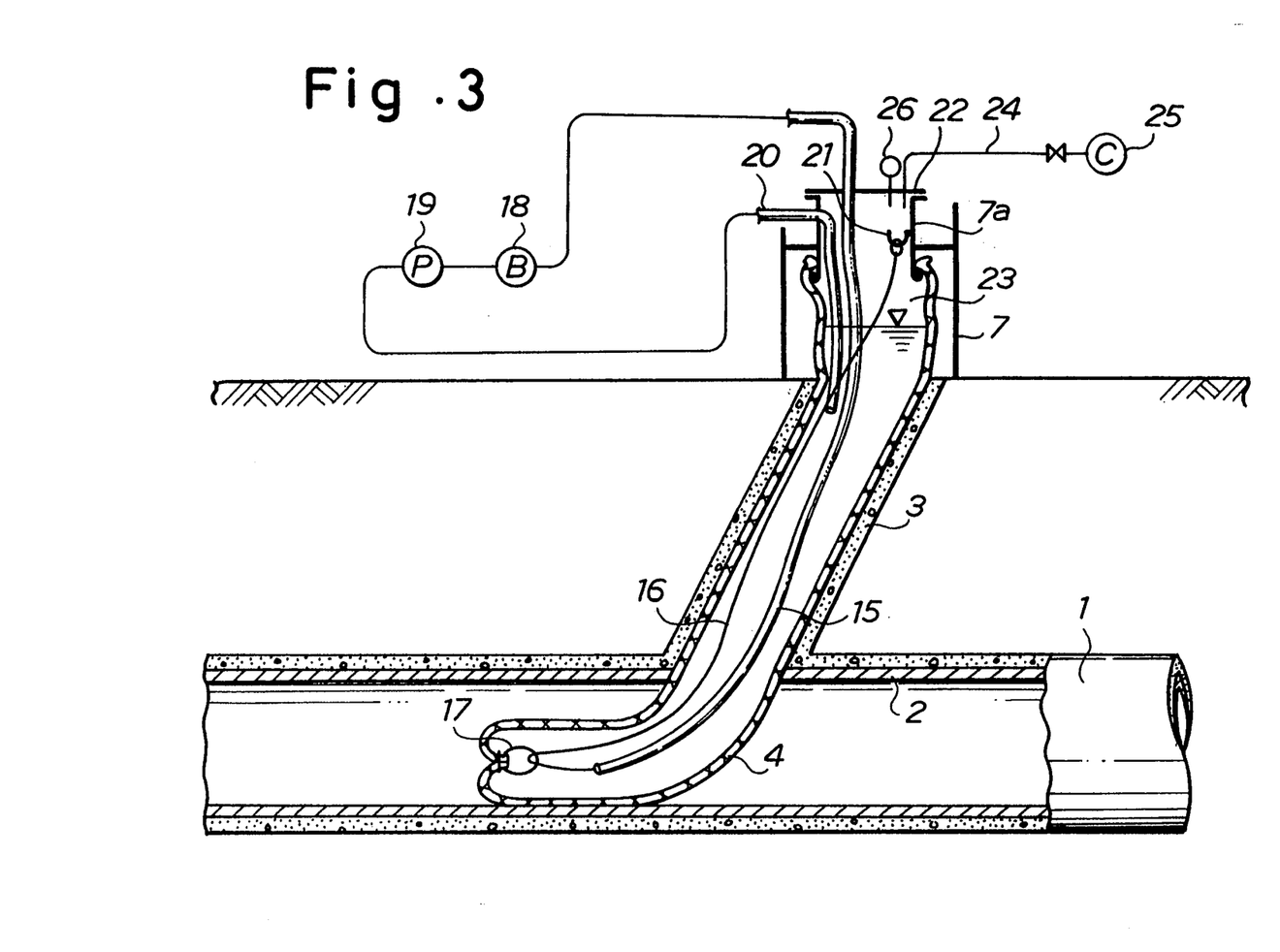
FIG. 3 is a view similar as FIG. 1 illustrating another step of the branch pipe lining method of the invention.

Now, in the present embodiment, an on-the-sleigh robot 9 is introduced in the main pipe 1, as shown in FIG. 2. Pull ropes are tied to this robot 9 to pull it in either direction in the main pipe 1. The robot 9 is equipped with a hydraulically-operated cutter and a hydraulically-operated piston cylinder 10. When the robot is brought to an appropriate position relative to the head 4b of the liner bag 4, as shown in FIG. 2, the piston cylinder 10 is operated to throw out its piston rod 10a to push the head 4b of the liner bag 4 leftward, as seen in FIG. 2; whereupon the stranded head 4b of the liner bag 4 is turned to look leftward (downstream) and finds a room to evert itself further on in this direction, which it does until all the uneverted portion 4a of the bag 4 is everted (FIG. 3). The turned head 4b of the liner bag 4 is drawn in the broken line in FIG. 2.

Figure 9A:
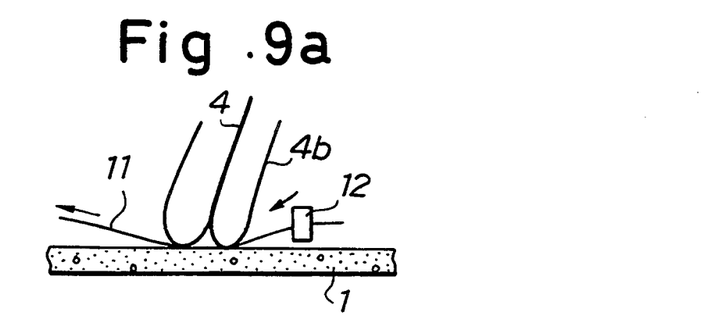
FIGS. 9(a)-(c) is a set of illustrations showing different manners of how the head portion of a branch pipe liner bag is dislocated to change eversion direction.
Figure 9B:
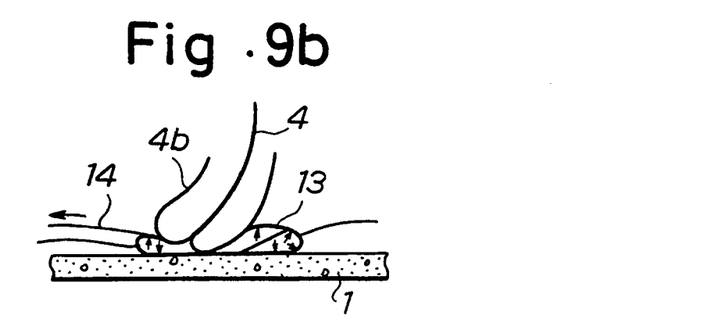
Figure 9C:
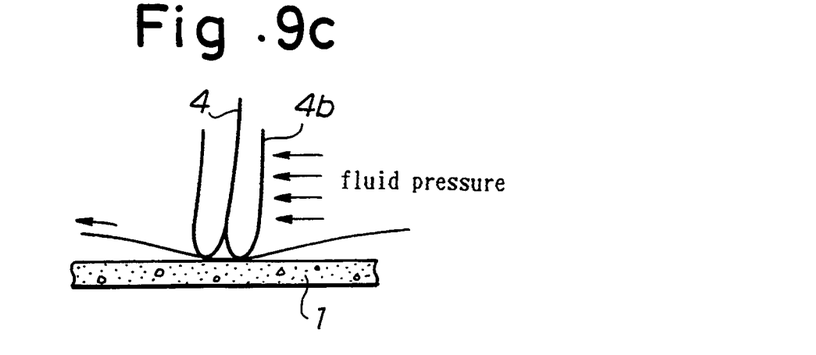

Of course, there can be conceived various alternatives to this robot 9 as a means to dislocate the stranded head 4b of the liner bag 4, and FIG. 9 shows some of them which the present inventor tried and found practical. It is probably possible for a skilled person in this art to come up with an even better device than any of these; however, so long as the result is to turn the head of the liner bag 4 downstream, the device is within the realm of this invention. In other words, the present invention lies in the idea of turning the deadlocked head of the liner bag 4 to the downstream direction of the main pipe 1.

Method (a) of FIG. 9 utilizes a pull rope 11 with a hook block 12 tied halfway to it, and this rope is passed through the main pipe 1 before the liner bag 4 is inserted in the branch pipe 3. When the head 4b of the everted liner bag 4 hits upon the inner wall of the main pipe 1, the rope 11 is pulled downstream and the hook block 12 engages with the head 4b to dislocate and turn it.

Method (b) utilizes an air bag 13 and a pull rope 14, and when the head 4b of the everted liner bag 4 lands on the air bag 13, the air bag 13 is inflated and the rope 14 is pulled downstream together with the air bag 13 and the head 4b is dislocated and turned.

Method (c) utilizes a pressurized flow of a fluid such as water and air. When the head 4b of the everted liner bag 4 hits upon the inner wall of the main pipe 1, a fluid is forced downstream from the right end of the main pipe 1, as seen in (c) of FIG. 9, and the everted liner bag 4 is pressed to turn it head 4b.

When the stranded head 4b of the liner bag 4 is thus dislocated and turned downstream, the water pressure causes the head 4b to start everting until all the uneverted portion 4a is everted, as shown in FIG. 3, and there remains no uneverted portion 4a.

Incidentally, in FIG. 2, reference numeral 15 designates a hot water hose. One end of the hot water hose 15 is tied to a rope 16, which is passed through a ring 17 provided at the tail end of the uneverted portion 4a of the liner bag 4, and the free end of which is retained on the ground. When the liner bag 4 is everted into the branch pipe 3 and hits upon the inner wall of the main pipe 1, the rope 16 is pulled up so that the hose 15 is drawn into the everted liner bag 4.

When the entire length of the branch pipe liner bag 4 is everted as described above, the free end of the rope 16 is pulled up so that the hot water hose 15 is drawn deep to almost reach the ring 17 provided at the tail end of the liner bag 4, and so as not to allow the hose 15 to recede, the ringed free end of the rope 16 is hooked on a hook 21 provided on the inner wall of the pressure cap 7a, as shown in FIG. 3. Also, the open top of the pressure cap 7a of the frame 7 is closed with a lid 22 so that an air room 23 is enclosed defined by the pressure cap 7a, the branch pipe liner bag 4 and the hot water. An air hose 24 leading out from an air compressor 25 is plugged in a port of the lid 22 to communicate the air room 23 with the air compressor 25. Incidentally, another hole of the lid 22 is plugged with a pressure gauge 26, as shown in FIG. 3.

Thus, when the entire length of the branch pipe liner bag 4 is everted as described above, the compressor 25 is operated to force air into the air room 23 and the pressure on the water in the liner bag 4 is maintained at a constant value so that the bag 4 is kept inflated and pressed against the inner wall of the branch pipe 3, as shown in FIG. 3. At this juncture, the hot water heated in a boiler 18 installed on the ground is forced into the hot water hose 15 by means of a hot water pump 19 and is supplied into the branch pipe liner bag 4. After heating the branch pipe liner bag 4, the hot water is drawn up into another hot water hose 20 and returned to the boiler 18, where the lukewarm water is heated up again. Then, the heated water is sent back to the branch pipe liner bag 4 to cure the thermosetting resin soaked in the thickness of the branch pipe liner bag 4, and this circulation is continued until the liner bag 4 is sufficiently heated.

Incidentally, since there has remained no uneverted tail 4a of the liner bag 4, the hot water hose 15 can be drawn as deep as the head portion 4b of the liner bag 4 so that the hot water circulates well into the head port: of the liner bag 4; as a result, the head portion 4b cures thoroughly and uniformly and there occur no incompletely cured regions.

Figure 4:
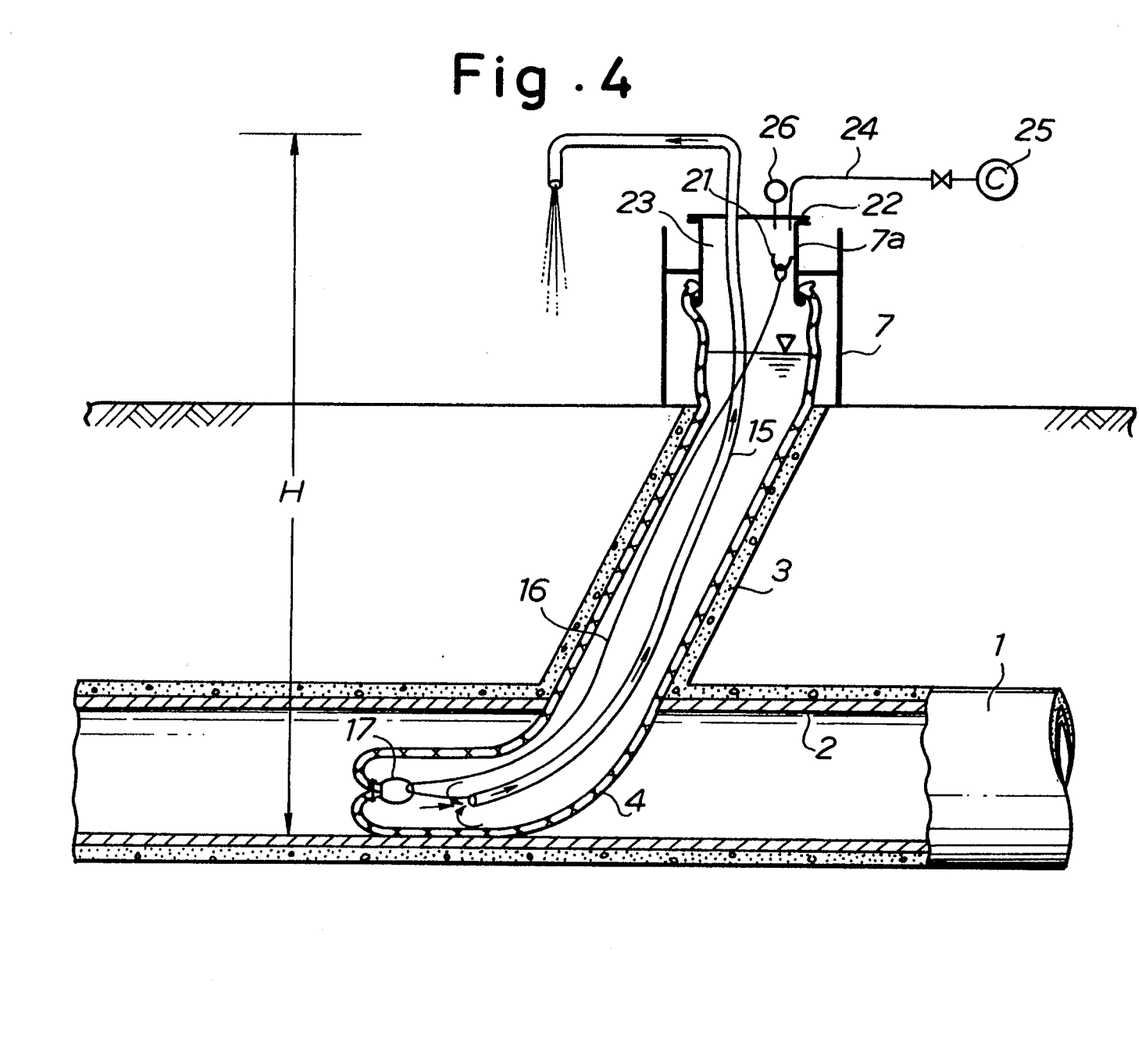
FIG. 4 is a view similar as FIG. 1 illustrating another step of the branch pipe lining method of the invention.

Thus, when the entire length of the branch pipe liner bag 4 is uniformly hardened, as described above, the air compressor 25 is operated to increase its force with which the air is supplied to the air room 23 via the air hose 24; as a result the pressure in the air room 23 is increased and the pressure on the water in the liner bag 4 is heightened so much so that the hot water in the branch pipe liner bag 4 is forced to flow backward in the hot water hose 15 and is discharged on the ground, and this operation of the air compressor 25 is continued until the last of the water in the branch pipe liner bag 4 is forced out. Incidentally, in order to force out the entire amount of hot water from the branch pipe liner bag 4 it is necessary to maintain the pressure P inside the air room 23 at a value greater than g H (wherein g is the specific gravity of the hot water and H is the water head, as shown in FIG. 4).

Figure 5:
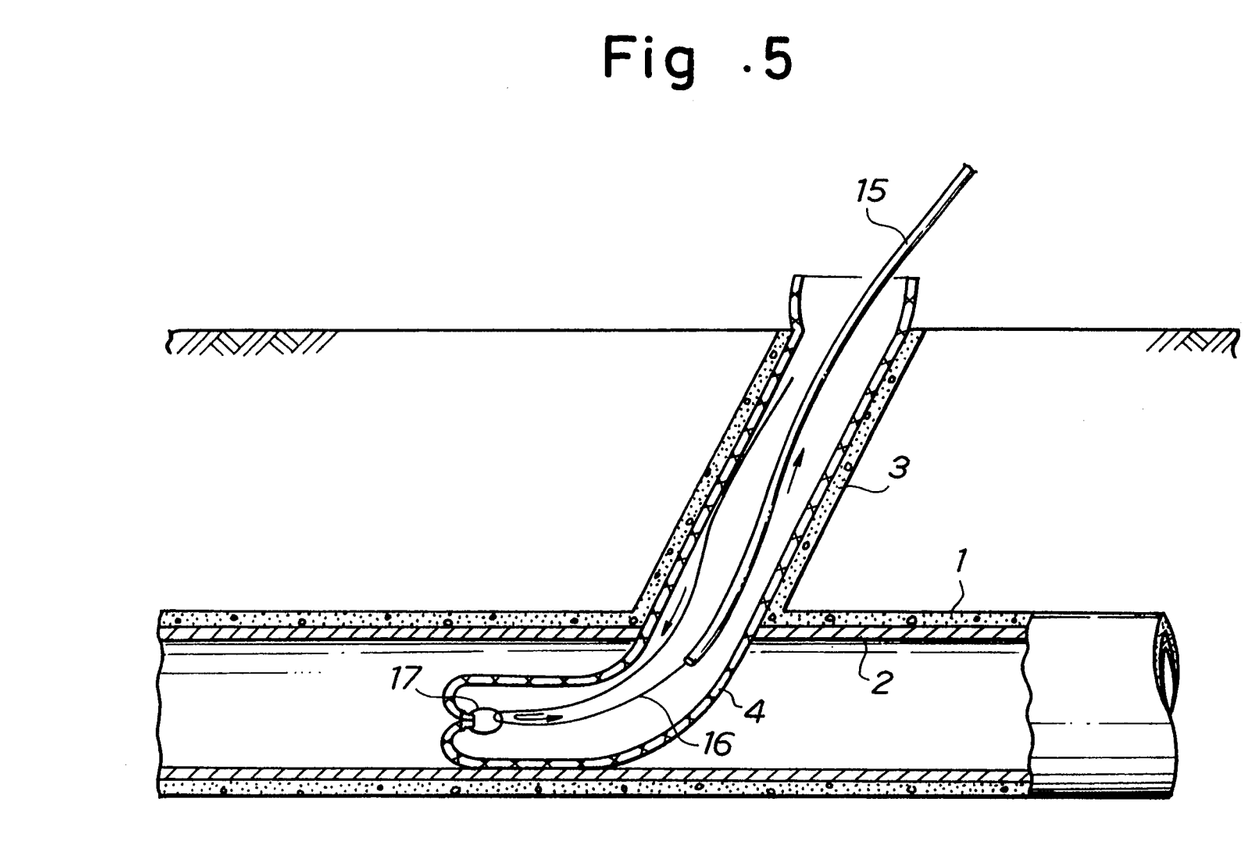
FIG. 5 is a view similar as FIG. 1 illustrating another step of the branch pipe lining method of the invention.

When all the amount of hot water is removed from the branch pipe liner bag 3, as described above, the ringed end of the rope 16, which was hooked on the hook 21 is unhooked from the hook 21, and the frame 7 is removed from above branch pipe 3, and, as shown in FIG. 5, the hot water hose 15 is pulled up and removed from branch pipe 3. Incidentally, as described before, the rope 16 is passed through the ring 17 provided at the tail end of the branch pipe liner bag 4 so that when the hot water hose 15 is pulled up, the rope 16 easily passes through the ring 17 so that the hot water hose 15 is easily pulled away from the branch pipe 3. When the hot water hose 15 is removed, the unnecessary portion of the hardened branch pipe liner bag 4 is cut off by means of the on-the-sleigh robot 9, which is introduced in the main pipe 1, the unnecessary portion being that portion which extends into the main pipe 1.

Figure 6:
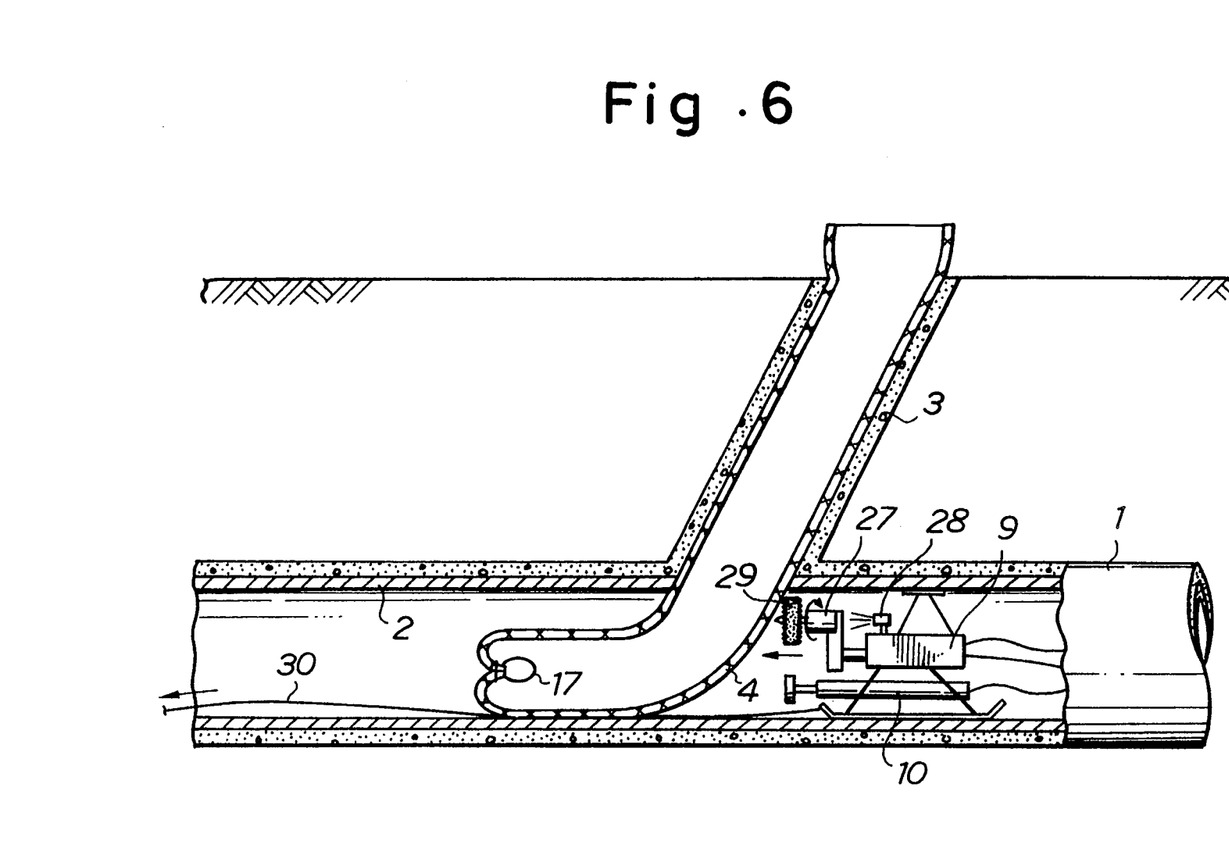
FIG. 6 is a view similar as FIG. 1 illustrating another step of the branch pipe lining method of the invention.

Besides the hydraulically-operated piston cylinder 10, the on-the-sleigh robot 9 is equipped with a hydraulically-operated motor 27, a TV camera 28, etc., and the unnecessary portion of the branch pipe liner bag 4 is cut off by a rotary cutter 29 which is locked about the output shaft of the motor 27. More descriptively, while observing the position of the unnecessary portion of the liner bag 4 by means of the TV camera 28, the operator on the ground causes the robot 9 to move to and fro by pulling and letting go the pull ropes 30 until the robot 9 assumes a desirable position relative to the unnecessary portion of the liner bag 4; then, the rotary cutter 29 is turned at a high speed and the robot 9 is pulled downstream slowly, whereupon the cutter 29 cuts in the unnecessary portion of the liner bag 4, and this cutting is continued until the last remnant of the unnecessary portion is removed. Since there is no uncured gluey region in the branch pipe liner bag 4, the saw teeth of the cutter 29 do not clog, and hence the cutting operation can be conducted easily and smoothly.

Figure 7:
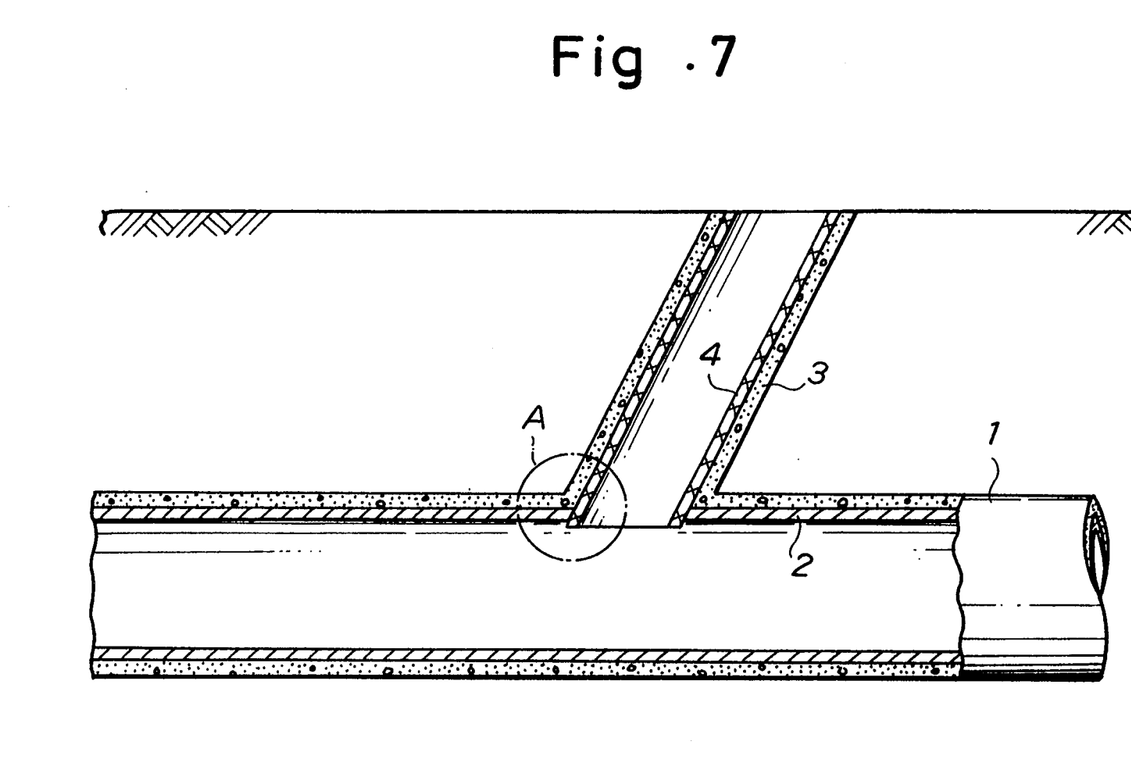
FIG. 7 is a view similar as FIG. 1 illustrating another step of the branch pipe lining method of the invention.
Figure 8:
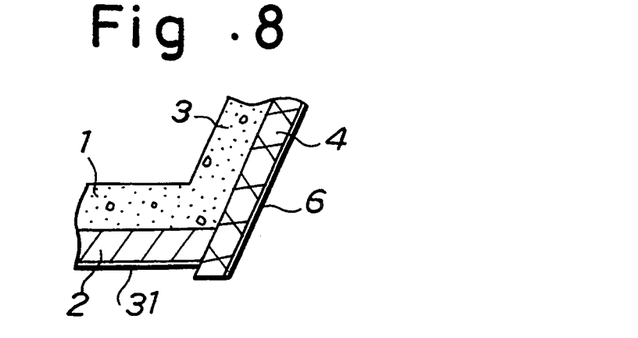
FIG. 8 is an enlarged view of the portion A of FIG. 7.

This cutting operation completes the series of the lining operation, and as the result, the inner wall of the branch pipe 3 is lined with the cured branch pipe liner 4, as shown in FIG. 7. Incidentally, the juncture where the branch pipe liner 4 and the main pipe liner 2 meet each other is merged to form a continuous liner, as shown in FIG. 8, by virtue of the bonding function of the thermosetting resin impregnated in the branch pipe liner 4. Incidentally, in FIG. 8, reference numeral 6 designates a plastic film which covers up the inner surface of the branch pipe liner 4, and reference numeral 31 designates a plastic film which covers up the inner surface of the main pipe liner 2.

Now, in the above-described embodiment, the branch pipe 3 is lined in accordance with the method of the invention after the main pipe 1 is lined beforehand. Since the inner wall of the main pipe 1 is covered with the plastic film 2, the head of the everted liner bag 4 does not stick to the inner wall of the main pipe 1, when it hits upon the inner wall of the main pipe 1, owing to the surface releasability of the plastic film 2. In the case where only the branch pipe 3 is to be lined, it is also possible to adopt the method of the present invention; but if a similar branch pipe liner bag as the liner bag 4 is used, then when the eversion head of the everting liner bag 4 hits upon the inner wall of the main pipe 1, which is not lined with the liner 2, and therefore, not covered up with the plastic film 2, the eversion head of the branch pipe liner bag 4 would stick to the inner wall of the main pipe 1. To prevent this inconvenience, a branch pipe liner bag 34 as shown in FIG. 11 ought to be used.

Figure 11:
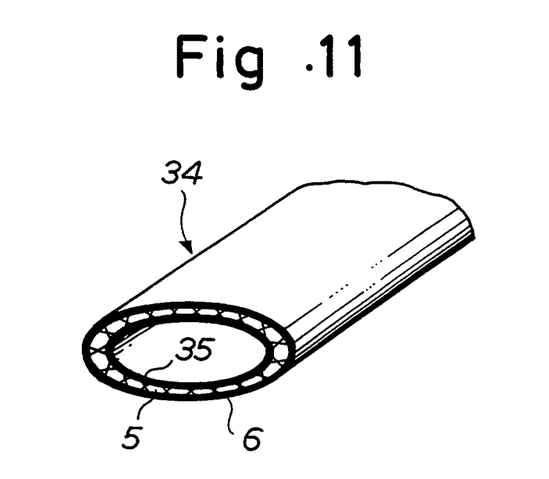
FIG. 11 is a sectional perspective view of a branch pipe liner bag according another embodiment of the invention.

FIG. 11 is a sectional perspective view of a branch pipe liner bag 34 before eversion, and the branch pipe liner bag 34 is internally coated with a highly impermeable barrier film 35. Incidentally, in FIG. 11, reference numeral 5 designates a tubular nonwoven resin-absorbent fabric of polyester felt, and, like that of the branch pipe liner bag 4, this fabric is impregnated with thermosetting resin.

Thus, if the branch pipe liner bag 34 is used to line the branch pipe 3 with, the branch pipe liner bag 34 when it is everted will have a non-adhesive external surface consisting of the barrier film 35, so that the eversion head of the branch pipe liner bag 34 does not stick to the inner wall of the main pipe 1. Thus, the unnecessary portion of the everted liner bag 34 will be easily removed.

Result of the Invention

As is clear from the above explanation, according to the invention, although the branch pipe liner bag will be kept from everting as its eversion head is stopped by the inner wall of the main pipe, the eversion head is forced to turn downstream, so that the branch pipe liner bag can be eventually everted completely. Therefore, no portion will remain uneverted of the liner bag. As a result, when hot water, for example, is supplied into the branch pipe liner bag which has been inserted in the branch pipe as described above, the hot water will circulate well into the fore end of the liner bag and causes the thermosetting resin soaked in the liner bag to promptly harden thoroughly and uniformly, so that there occur scarce regions where the branch pipe liner bag is only half hardened.

Also, since there remains no uneverted portion of the hardened branch pipe liner bag, the subsequent operation of cutting away the portion of the liner bag that extends into the main pipe is made easy.

While the invention has been described in its preferred embodiments, it is to be understood that modifications will occur to those skilled in the art without departing from the spirit of the invention. For instance, the thermosetting resin may be replaced by another hardenable resin such as photosetting resin. The scope of the invention is therefore to be determined solely by the appended claims.

What is claimed is:

1. A method for lining a branch pipe branching off a main pipe consisting of the steps of: (a) preparing a tubular liner bag by sewing a rectangular nonwoven resin-absorbent fabric into a tubular shape with one end closed and cutting it to a length substantially greater than the length of the branch pipe to be lined; (b) attaching an impermeable plastic film over the external surface of this tubular liner bag; (c) soaking said nonwoven resin-absorbent fabric with a hardenable fluid resin; (d) everting said liner bag into the branch pipe from the ground to the main pipe by means of a fluid pressure until the eversion head of the liner bag is stopped by the inner wall of the main pipe; (e) forcing said eversion head of the liner bag to turn downstream in the main pipe, thus allowing the the liner bag to evert entirely; (f) hardening said hardenable fluid resin while inflating said liner bag by means of the fluid pressure; and (g) removing that portion of said liner bag which protrudes into said main pipe.

2. The method as recited in claim 1 wherein prior to step (d) the main pipe is first lined with a liner and that portion of the liner which closes the hole to the branch pipe is removed.

3. The method as recited in claim 1 wherein the inner surface of said liner bag before eversion is covered with an impermeable barrier film.

4. The method as recited in claim 1 wherein in step (g) the removal of said portion of the liner bag is conducted by means of a rotary cutter driven by a motor and installed on a robot which can reciprocate freely in the main pipe.

5. The method as recited in claim 1 wherein in step (e) a pull rope with a hook block tied halfway to it is passed in the main pipe beforehand such that the eversion head of the liner bag lands on the rope at a location downstream to the hook block, and the pull rope is pulled downstream so as to force the eversion head to turn.

6. The method as recited in claim 1 wherein in step (e) a pull rope with an air bag tied halfway to it is passed in the main pipe beforehand such that the eversion head of the liner bag lands on the air bag, and the pull rope is pulled downstream after the air bag is inflated so as to force the eversion head to turn.

7. The method as recited in claim 1 wherein in step (e) a pressurized flow of a fluid is applied downstream to the eversion head so as to force the eversion head to turn.

8. The method as recited in claim 1 wherein said hardenable fluid resin is a thermosetting resin.

* * * * *